United States Patent
Rusher et al.

(10) Patent No.: US 8,585,120 B2
(45) Date of Patent: Nov. 19, 2013

(54) TONNEAU COVER RETENTION AND DRAIN SYSTEMS

(75) Inventors: Ryan Rusher, Yankton, SD (US); Jerome Facchinello, Grand Blanc, MI (US)

(73) Assignee: Extang Corporation, Ann Arbor, MI (US)

( * ) Notice: Subject to any disclaimer, the term of this patent is extended or adjusted under 35 U.S.C. 154(b) by 0 days.

(21) Appl. No.: 13/572,867

(22) Filed: Aug. 13, 2012

(65) Prior Publication Data
US 2013/0001979 A1   Jan. 3, 2013

Related U.S. Application Data

(63) Continuation-in-part of application No. 12/609,203, filed on Oct. 30, 2009, now Pat. No. 8,262,148.

(51) Int. Cl.
*B60P 7/04*   (2006.01)
(52) U.S. Cl.
USPC .................................. 296/100.09; 296/100.18
(58) Field of Classification Search
USPC ............ 296/100.06, 100.07, 100.09, 100.16, 296/100.17, 100.18
See application file for complete search history.

(56) References Cited

U.S. PATENT DOCUMENTS

| | | | |
|---|---|---|---|
| 4,861,092 A | 8/1989 | Bogard | |
| 5,743,586 A | 4/1998 | Nett | |
| 6,082,806 A * | 7/2000 | Bogard | 296/100.06 |
| 7,537,264 B2 | 5/2009 | Maimin et al. | |

* cited by examiner

*Primary Examiner* — Joseph Pape
(74) *Attorney, Agent, or Firm* — Harness, Dickey & Pierce, P.L.C.

(57) ABSTRACT

A tonneau cover system for a cargo box of a pickup truck comprising a plurality of tonneau sections each being pivotally coupled to the other to permit pivotal movement of a first tonneau sections relative to a second tonneau sections between an opened position and a closed position. The tonneau cover system further comprises a side rail member connectable to a side wall of the cargo box, a keeper member downwardly extending from the first tonneau sections for pivotal movement therewith between the opened position and the closed position; and a first keeper pin coupled with the side rail member. The keeper member automatically engages the first keeper pin when the first tonneau section is pivoted into the closed position and automatically disengages the first keeper pin when the first tonneau section is pivoted into the open position.

13 Claims, 5 Drawing Sheets

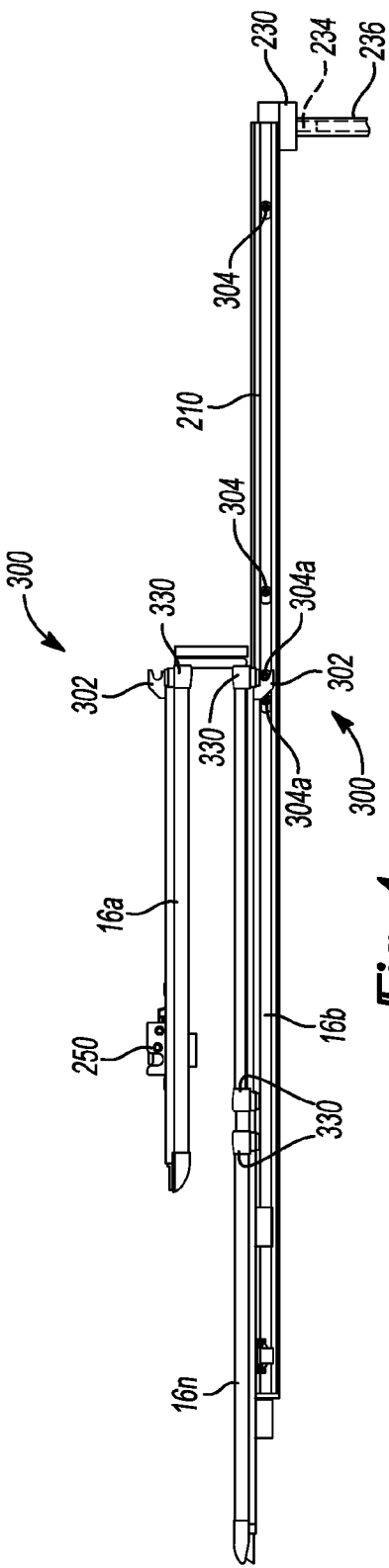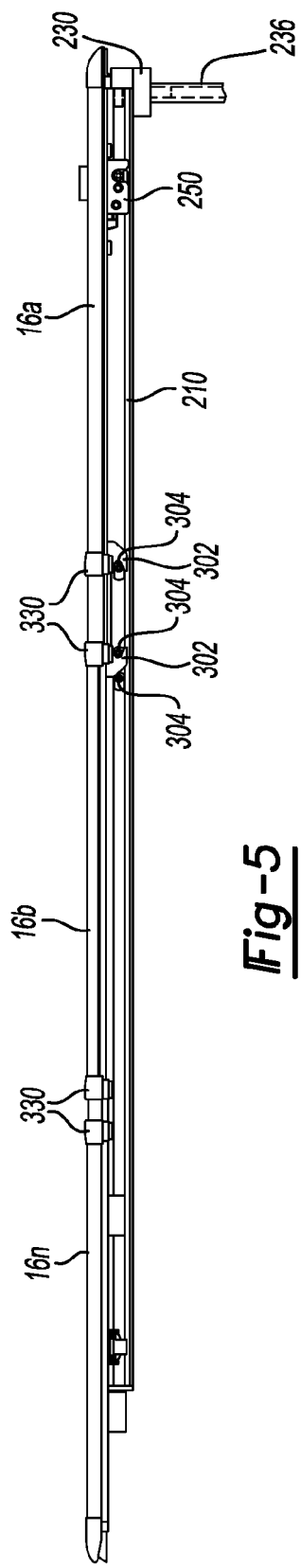

TONNEAU COVER RETENTION AND DRAIN SYSTEMS

CROSS-REFERENCE TO RELATED APPLICATIONS

This application is a continuation-in-part of U.S. patent application Ser. No. 12/609,203 filed on Oct. 30, 2009, the entire disclosure of which is incorporated herein by reference.

FIELD

The present disclosure relates to relates to coverings for pickup trucks and, more particularly, relates to a tonneau cover system having a novel panel retention keeper system for quickly and conveniently retaining the tonneau cover and an associated, optional, drain system.

BACKGROUND

This section provides background information related to the present disclosure which is not necessarily prior art.

Tonneau covers have been used for a number of years to cover the cargo box of pickup trucks against dirt, debris, and other environmental contaminants and to improve the aesthetic quality thereof. Originally, tonneau covers were designed by upholstery shops and typically made of vinyl covered fabrics or canvas. The material was often doubled over along its edges for added strength and appearance. Male snaps were then attached to the sides of the cargo box of the pickup truck via fasteners, while female snaps were attached along the edges of the cover. Wooden bows were sometimes used to span the cargo box and ensure that the cover remained high enough to drain water. Unfortunately, these covers were sometimes difficult to handle and/or manufacture, and occasionally failed to protect the cargo box.

More recently, foldable tonneau covers are often more desirable in that they conveniently cover the bed of the pickup truck for cargo protection. However, when not in use, the foldable tonneau cover may be folded toward the rear of the passenger cabin (or other location). Generally, foldable tonneau covers include a frame network of cross bows, a tarp or covering operably coupled to and spanning the frame network, a latching system for coupling the frame network to the pickup truck and a means for stowing the latching system, and a hinge system for hingedly coupled adjacent sections of the foldable tonneau cover. However, the known prior art fails to maximize the ease and effectiveness of foldable tonneau covers and, thus, many foldable tonneau covers suffer from numerous disadvantages.

When conventional foldable tonneau covers are stowed, that is when the tonneau cover is folded and positioned generally adjacent the passenger cabin, it is important to ensure that any clamps or latching members are easily released to enable quick and convenient access to the pickup bed area and/or contents. It is also important that the tonneau cover is properly and securely retained to the cargo box of the pickup truck. Although various systems have been used to attempt such connections, many rely on complex and complicated attachment systems.

In some systems, water leaks and other drainage issues can compromise the tonneau system and/or the contents of the cargo box. Although seals and other solutions have been used to combat such drainage and/or leakage problems, an inexpensive and effective solution has not, until now, been found.

Accordingly, there exists a need in the relevant art to provide a tonneau cover system capable of overcoming the disadvantages of the prior art. Additionally, there exists a need in the relevant art to provide a tonneau cover system, and in particular a retention system that securely retains the tonneau cover in a closed positions and permits simple and convenient disengagement of the retention system when opening the tonneau system or otherwise gaining access to the cargo box. Still further, there exists a need in the relevant art to provide a tonneau cover system having a drain system to safely drain water and/or prevent other contaminants from entering the cargo box.

SUMMARY

This section provides a general summary of the disclosure, and is not a comprehensive disclosure of its full scope or all of its features. According to the principles of the present teachings, a tonneau cover system for a cargo box of a pickup truck is provided having advantageous construction and methods of operation. The system comprises a plurality of tonneau sections each being pivotally coupled to the other to permit pivotal movement of a first tonneau sections relative to a second tonneau sections between an opened position and a closed position. The tonneau cover system further comprises a side rail member connectable to a side wall of the cargo box, a keeper member downwardly extending from the first tonneau sections for pivotal movement therewith between the opened position and the closed position; and a first keeper pin coupled with the side rail member. The keeper member automatically engages the first keeper pin when the first tonneau section is pivoted into the closed position and automatically disengages the first keeper pin when the first tonneau section is pivoted into the open position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a side view illustrating the tonneau cover having a retention system coupled to the tonneau sections in a closed position having the forward tonneau section retracted;

FIG. 5 is a side view illustrating the tonneau cover having a retention system coupled to the tonneau sections in a closed position;

Corresponding reference numerals indicate corresponding parts throughout the several views of the drawings.

DETAILED DESCRIPTION

Figure 1:
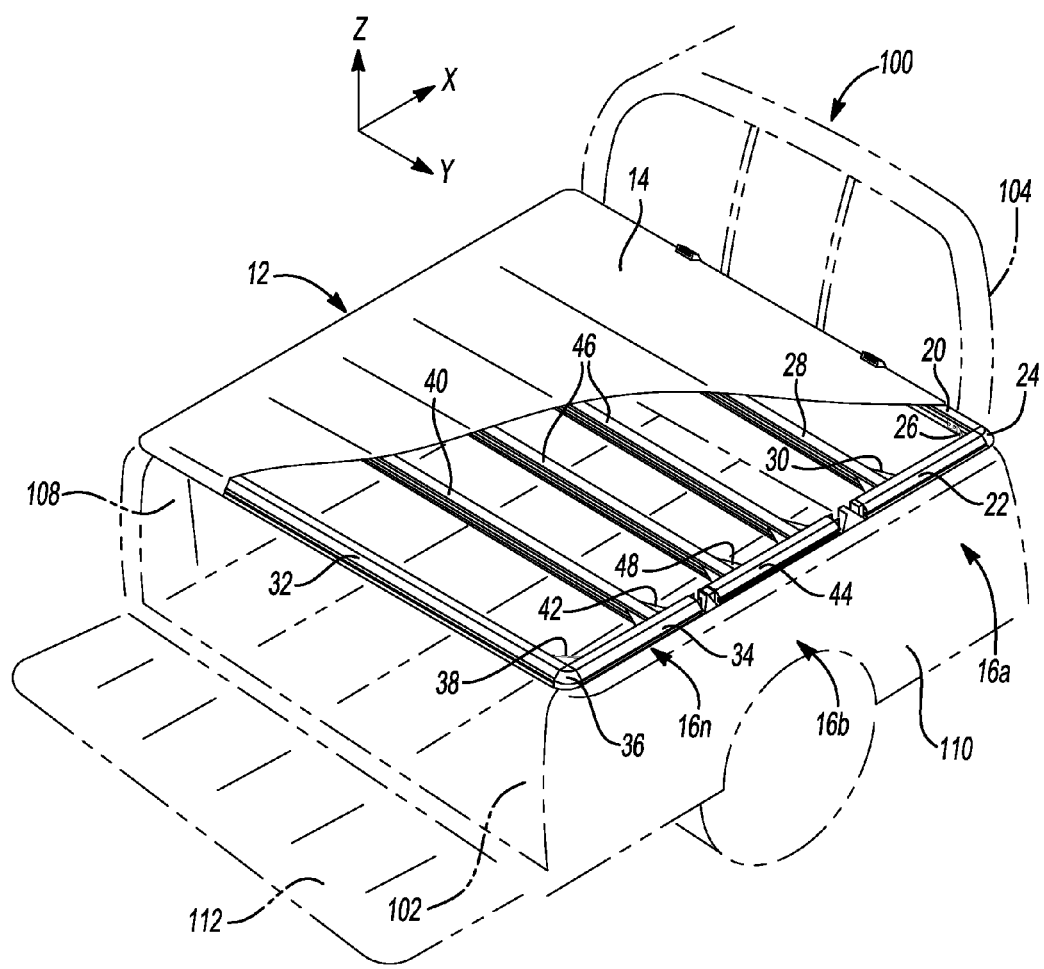
FIG. 1 is a perspective view illustrating a tonneau cover according to the principles of the present teachings positioned upon a cargo box of a pickup truck.
Figure 2:
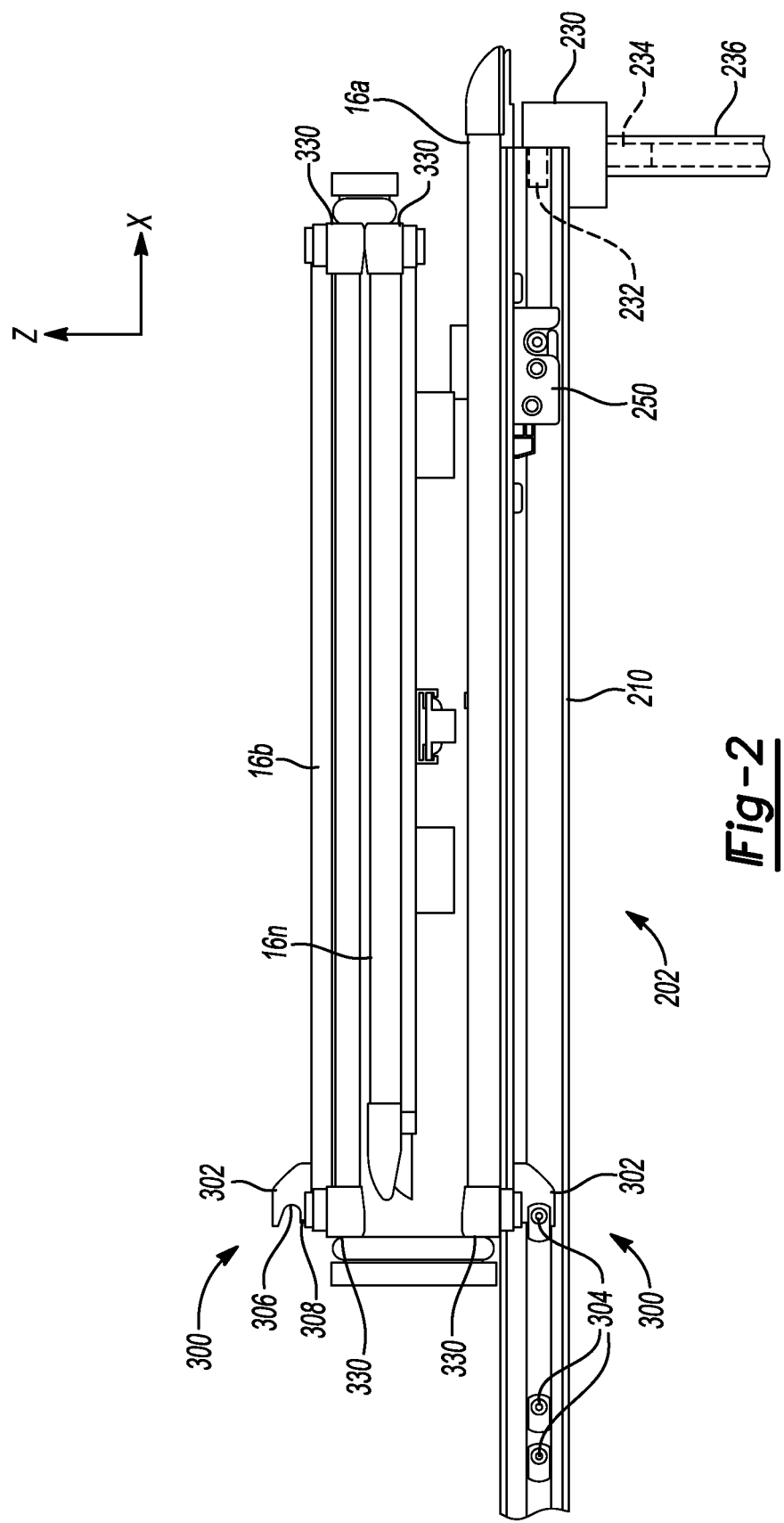
FIG. 2 is a side view illustrating the tonneau cover having a retention system coupled to the tonneau sections stacked in a forward arrangement.
Figure 3:
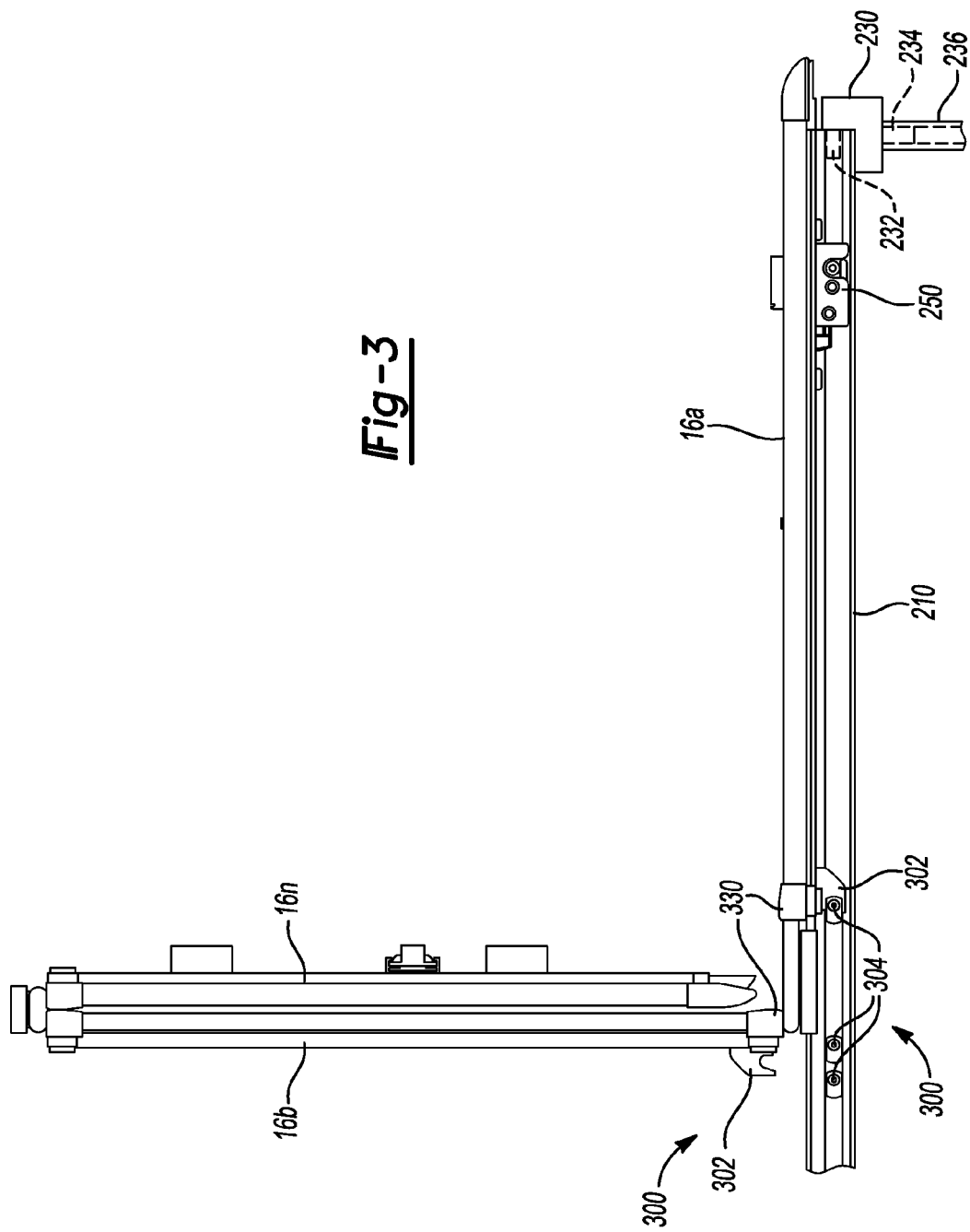
FIG. 3 is a side view illustrating the tonneau cover having the retention system coupled to the tonneau sections with the forward tonneau section closed and the remaining tonneau sections in an intermediate retracted position.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a pickup truck 100 is shown having a foldable tonneau system 12 for use with pickup truck 100. Pickup truck 100 generally includes a cargo box 102 and a passenger cabin 104. Cargo box 102 includes a front wall (not shown), a left sidewall 108, a right sidewall 110, and a rear wall or tailgate 112. It should be understood that right sidewall 110 and left sidewall 108 of pickup truck 100 are identical, yet arranged in mirrored symmetry. Accordingly, in the interest of brevity, only one side will be discussed in detail below in connection with foldable tonneau system 12 unless noted otherwise Still referring to FIG. 1, foldable tonneau system 12 includes, in some embodiments, a flexible, stretchable fabric cover 14 (or other suitable cover material being soft or hard) that is drawn tightly over a plurality of tonneau sections 16. It should be understood that the principles of the present invention are equally applicable to foldable tonneau systems having two, three, or more sections, each foldable relative to adjacent sections. However, for purposes of this disclosure, a foldable tonneau system having three tonneau sections 16a, 16b, and 16n will be described. This configuration should not be regarded as limiting the claims herein. Tonneau sections 16a-16n may be referred to herein as front tonneau section 16a, middle tonneau section 16b, and rear tonneau section 16n.

Each of the plurality of tonneau sections 16a-16n includes an internal framework of support members that are attached to one another to form a rectangular frame. Specifically, front tonneau section 16a includes a front rail member 20 fixedly coupled to a pair of side members 22 via a corner insert 24. Corner insert 24 is preferably rounded along an exterior surface to prevent stress concentrations in fabric cover 14. Corner insert 24 includes a pair of male portions (not shown) sized to be fixedly received and engaged within front rail member 20 and the pair of side members 22. A corner brace 26 is fixedly coupled, via conventional threaded fasteners, between front rail member 20 and each side member 22 to provide improved structural integrity. Front tonneau section 16a further includes one or more cross bow members 28 being generally parallel to front rail member 20 and spaced apart therefrom (in some embodiments, other tonneau sections can also include cross bow members, such as cross bow members 46 of tonneau section 16b). In some embodiments, cross bow member 28 is generally C-shaped in cross section and is fixedly coupled to the pair of side members 22 via a corner brace 30 disposed on opposing ends thereof. It should be understood that additional or alternative connection features may be employed to couple cross bow member 28 to the pair of side members 22. Moreover, it should be understood that cross bow members 28, 40, and 46 can be made of any suitable material and define any suitable cross-sectional size and shape. The pair of side members 22 is adapted to rest upon a top surface of sidewalls 108 and 110.

Similarly, rear tonneau section 16n includes a rear rail member 32 fixedly coupled to a pair of side members 34 via a corner insert 36. Corner insert 36 is preferably rounded along an exterior surface to prevent stress concentrations in fabric cover 14. Corner insert 36 includes a pair of male portions (not shown) sized to be fixedly received and engaged within rear rail member 32 and the pair of side members 34. A corner brace 38 is fixedly coupled, via conventional threaded fasteners, between rear rail member 32 and each side member 34 to provide improved structural integrity. Rear tonneau section 16n further includes a cross bow member 40 being generally parallel to rear rail member 32 and spaced apart therefrom. For manufacturing simplicity, cross bow member 40 can be identical to cross bow member 28 in cross section and side members 34 can be similar to, but vary in length relative to, side member 22. However, it should be appreciated that this is not required.

Cross bow member 40 is fixedly coupled to the pair of side members 34 via a corner brace 42 disposed on opposing ends thereof. Again, it should be understood that additional or alternative connection features may be employed to couple cross bow member 40 to the pair of side members 34. The pair of side members 34 is adapted to rest upon a top surface of sidewalls 108 and 110.

For additional detail relating to the construction of tonneau sections 16a, 16b, and 16n, and their association interconnection, attention should be directed to commonly-assigned U.S. Pat. No. 7,188,888, which is incorporated herein by reference.

In some embodiments, as illustrated in FIGS. 1-7, foldable tonneau system 12 can comprise a bracket system 202 for mounting to any one or more of front wall (not shown), left sidewall 108, right sidewall 110, and rear wall or tailgate 112. In some embodiments, bracket system 202 can comprise side rails 210 mounted to side walls 108, 110 using a conventional or otherwise clamping system to provide support for foldable tonneau system 12. In some embodiments, side rails 210 can extend generally the length of side walls 108, 110 of cargo box 102. In some embodiments, side rails 210 can be fixedly coupled to side wall 108 via a clamp assembly. An example of a clamping system can be found in commonly-assigned U.S. Pat. No. 6,752,449, which is incorporated herein by reference.

Figure 6:
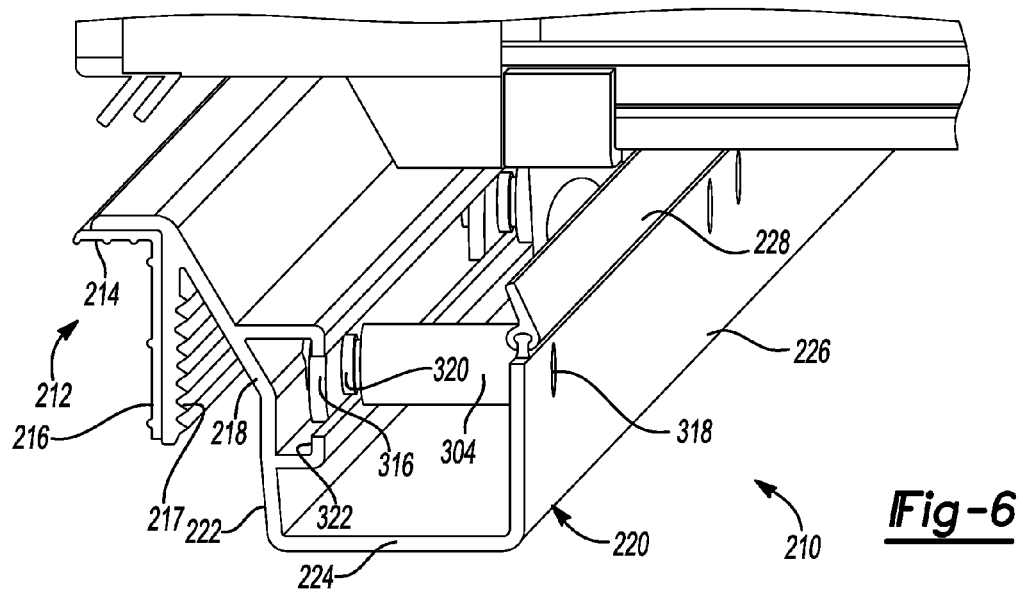
FIG. 6 is an enlarged perspective view illustrating a side rail member of the present teachings and corresponding keeper pins.
Figure 7:
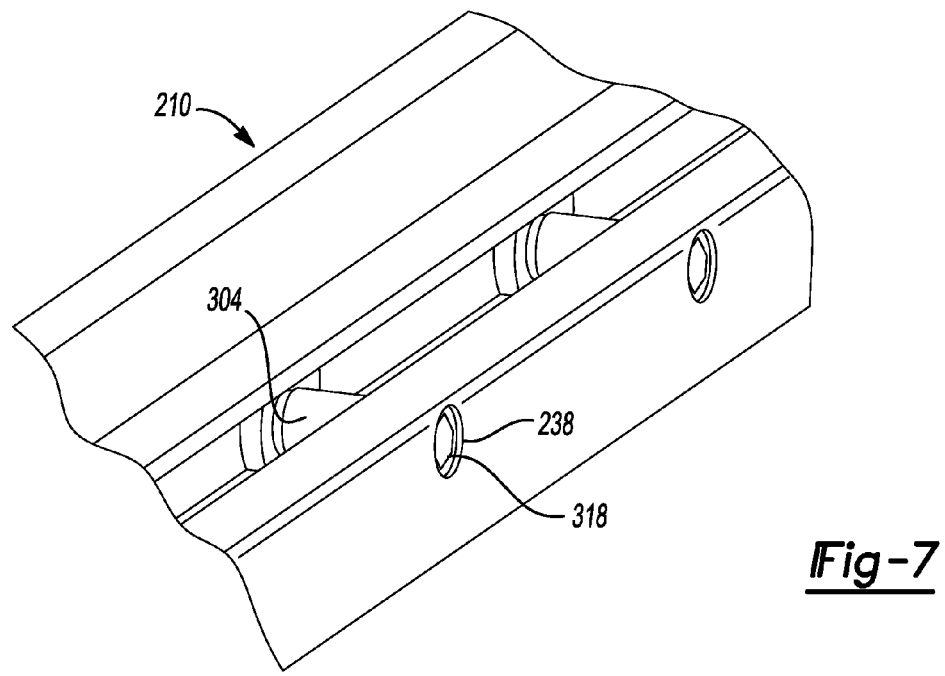
FIG. 7 is an enlarged perspective view illustrating the keeper pins extending through the side rail member.

As illustrated in FIGS. 6-7, side rails 210 can be mounted to a top and/or inboard surface of side walls 108, 110. In some embodiments, side rails 210 can comprise a cross-sectional profile that is conducive to mounting to side walls 108, 110 and further provide a drain system for evacuating water and/or other debris or contaminants prior to entry into cargo box 102. More particularly, side rails 210 can comprise a generally L-shaped portion 212 having a first portion 214 and a second portion 216 arranged in perpendicular fashion to be mounted on a complementary portion of side walls 108, 110 of cargo box 102. Specifically, first portion 214 can rest upon an upper surface of side walls 108, 100 to provide Z-axis support (e.g. vertical support) and second portion 216 can rest upon an inboard surface of side walls 108, 110 to provide Y-axis support (e.g. cross-vehicle support). Second portion 216 can comprise a series of retention teeth 217 does there along for engagement with a clamp assembly to facilitate fastening of side rails 210 to side walls 108, 110 of cargo box 102.

An angular member 218 can be joined to and extend from a junction of first portion 214 and second portion 216, or directly from second portion 216. Angular member 218, ideally, is inboardly-sloped to direct moisture and/or other liquids into a drain channel 220 formed at an elevational position generally below first portion 214 to encourage flow therein. Drain channel 220 can be positioned generally at or between a contact interface of tonneau cover system 12 and cargo box 102. In some embodiments, drain channel 220 comprises a vertically-extending outboard portion 222, a bottom portion 224, and a vertically-extending inboard portion 226, together forming a generally U-shaped cross-section.

In some embodiments, an optional seal member 228 (FIG. 6) can be disposed at a distal end of vertically-extending inboard portion 226 of drain channel 220. Optional seal member 228 can be configured to engage an underside surface of tonneau sections 16a, 16b, 16n; cross bow members 20, 28, 32, 40, 46; side members 22, 34, 44; or combinations thereof. It should be appreciated that seal member 228 can also be configured to engage any other feature or portion of tonneau system 12 to provide a sealing interface to inhibit moisture or other liquids from escaping from drain channel 220 and entering cargo box 102.

As illustrated in FIGS. 2-5, side rails 210 can further comprise an end member 230 engaging and terminating drain channel 220 to define a reservoir within drain channel 220. End member 230 can include an extension portion 232 having an outer shape that is complementary to a cross-sectional profile of drain channel 220 and/or side rails 210 to permit end member 230 to be slipped into an extruded end of side rails 210. End member 230 can further comprising a fluid passage terminating at an output flange 234. A tube or other member 236 can be fastened to output flange 234, if desired, to route moisture or other liquids captured in drain channel 220 to a desired drain point (e.g. beneath the pickup truck). In this way, moisture and other liquids can be effectively captured and subsequently drained from the vehicle without damaging cargo box contents, entering cargo box 102, and/or leading to vehicle corrosion.

Panel Retention Keeper System

Turning now to FIGS. 2-5, tonneau sections 16a, 16b, and/or 16n can be fixedly coupled to sidewall 108 of cargo box 110 via a panel retention keeper system 300. In some embodiments, panel retention keeper system 300 can be employed between any portions of foldable tonneau system 12 that provides sufficient structural integrity.

In some embodiments, one or more of the plurality of tonneau sections 16a, 16b, and 16n can comprise panel retention keeper system 300. In particular, panel retention keeper system 300 can include a keeper member 302 downwardly extending from any suitable structure of tonneau system 12 (e.g. frame network, cross members, side members, etc.). In some embodiments, keeper member 302 can be fixedly coupled to side member 22, 34, and/or 44. Keeper member 302 can be fastened thereto using any suitable method, such as fasteners, bonding, welding, or the like. In this arrangement, overall packaging of tonneau system 12 is improved, panel retention keeper system 300 is generally maintained in a concealed fashion when engaged, and overall appearance of tonneau system 12 is maximized. Moreover, keeper member 302 can be configured, as illustrated herein, to never extend within the volume of cargo box 102. As will be described, keeper member 302 can be contained with a side rail member and/or drain channel, thereby preventing any contact between keeper member 302 and contents of cargo box 102 (which may cause damage to one and/or the other).

As illustrated in FIGS. 2-5, keeper member 302 can be configured and arranged such that during operation of the respective tonneau section 16n, keeper member 302 is automatically engaged and disengaged from a corresponding keeper pin 304. More particularly, keeper member 302 can be generally planar and comprise a keeper pin receiving slot 306 formed in or along an engaging edge 308. In some embodiments, keeper pin receiving slot 306 can define a shape complementary to a cross-sectional shape of keeper pin 304. By way of example, keeper pin 304 can be generally cylindrical and, thus, keeper pin receiving slot 306 can be generally circular to receive keeper pin 304 therein.

Keeper pin 304 can, in some embodiments, be mounted to side rail 210 such that keeper pin 304 is fixedly carried by side rail 210 and, thus, is retained in position relative to side walls 108, 110 of cargo box 102. In this way, keeper pin 304 forms a rigid connection point for connection with keeper member 302 and the corresponding tonneau section 16n. As illustrated in FIGS. 6 and 7, keeper pin 304 can comprise a generally cylindrical cross-section having a first end 316 and a second end 318. First end 316, in some embodiments, can comprise a trunnion-type end defining a circumferential groove 320 extending thereabout. Trunnion-type end 316 can be received within a trunnion channel 322 formed in side rail 210. In some embodiments, trunnion channel 322 can comprise a C-shaped channel being formed in one or more of angular member 218 and vertically-extending outboard portion 222 of drain channel 220. The C-shaped trunnion channel 322 can capture trunnion-type end 316 such that portions of the C-shaped trunnion channel 322 are received within circumferential groove 320. Second end 318 of keeper pin 304 can be received within an aperture 238 formed in vertically-extending inboard portion 226 of drain channel 220.

The relative orientation of keeper member 302 and keeper pin 304 provides a number of advantages over conventional designs. Specifically, as illustrated in FIGS. 2-5 and mentioned herein, keeper member 302 can be fixedly coupled and downwardly extending from any suitable structure of tonneau system 12 (e.g. frame network, cross members, side members, etc.) and, thus, be carried by the corresponding tonneau section 16a, 16b, 16n. As tonneau section 16a, 16b, 16n rotates about tonneau hinges 330, keeper member 302 sweeps about an arcuate path that causes keeper member 302 to automatically rotate into and out of engagement with keeper pin 304. Therefore, as a user opens and closes any one of tonneau sections 16a, 16b, 16n and, thus, rotates the tonneau section about its hinge 330, keeper member 302 will sweeps out of and into engagement, respectively, with keeper pin 304. It should be appreciated that, generally, keeper pin receiving slot 306 and keeper pin 304 are aligned at a radial distance from the axis of rotation of hinge 330. In this way, keeper pin receiving slot 306 and keeper pin 304 can easily and reliably interconnect through pivotal movement of the tonneau section.

In some embodiments, keeper pin receiving slot 306 of keeper member 302 is sized and shaped to generally inhibit relative movement in a Z-axis between keeper member 302 (and fixedly associated tonneau section 16a, 16b, 16n) and keeper pin 304 (which, as will be described herein, is fixedly associated with cargo box 110). Thus, the connection of keeper member 302 and keeper pin 304 can generally inhibit any raising or lowering of the tonneau section 16a, 16b, 16n or tonneau cover relative to the pickup truck when in a closed and engaged position. Likewise, the connection of keeper member 302 and keeper pin 304 can serve to inhibit relative movement in at least one direction along an X-axis. That is, the connection of keeper member 302 and keeper pin 304 can inhibit movement in a vehicle longitudinal direction that results in keeper pin 304 to be forced further into keeper pin receiving slot 306 of keeper member 302. In some embodiments, the connection of keeper member 302 with a pair of keeper pins 304a (see FIG. 4) can serve to inhibit relative movement in both directions along the X-axis. That is, a first of the pair of keeper pins 304a engages the keeper pin receiving slot 306 of the keeper member 302 preventing movement in a first direction along the X-axis, while a second of the pair of keeper pins 304a engages a back side of keeper member 302 preventing movement in a second opposite direction along the X-axis. In some embodiments or in connection with some tonneau sections, such as tonneau section 16a, a pair of keeper pins 304a may not be necessary, as a latch (such as latch 250, FIG. 2) can serve as a connection inhibiting movement in at least one direction along the X-axis, while the remaining one keeper member 302 and keeper pin 304 combination can serve to inhibit movement in both directions along the Z-axis and at least one direction along the X-axis.

Unlike the prior art, the present teachings provide a tonneau cover system that provides an advantageous retention system that securely retains the tonneau cover in a closed positions and permits simple and convenient disengagement of the retention system when opening the tonneau system or otherwise gaining access to the cargo box. The present teachings also provide a tonneau cover system having a drain system to safely drain water and/or prevent other contaminants from entering the cargo box.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover system for a cargo box of a pickup truck, said tonneau cover system comprising:
 a plurality of tonneau sections each supporting a cover, said plurality of tonneau sections being positionable generally over the cargo box of the pickup truck, each of said plurality of tonneau sections being pivotally coupled to each other to permit pivotal movement of a first of said plurality of tonneau sections relative to a second of said plurality of tonneau sections between an opened position and a closed position;
 a side rail member connectable to a side wall of the cargo box;
 a keeper member downwardly extending from said first tonneau section, said keeper member being carried by said first tonneau section for pivotal movement therewith between said opened position and said closed position;
 a first keeper pin coupled with said side rail member, wherein said keeper member automatically engages said first keeper pin when said first tonneau section is pivoted into said closed position and automatically disengages said first keeper pin when said first tonneau section is pivoted into said open position; and
 a second keeper pin coupled with said side rail member, said second keeper being spaced apart from said first keeper pin such that said keeper member is received between said first keeper pin and said second keeper pin such that said first tonneau section is inhibited from longitudinal movement in a fore and aft direction along an X-axis.

2. The tonneau cover system according to claim 1 wherein when said keeper member automatically engages said first keeper pin when said first tonneau section is pivoted into said closed position, said first tonneau section is inhibited from vertical movement along a Z-axis.

3. The tonneau cover system according to claim 1 wherein when said keeper member automatically engages said first keeper pin when said first tonneau section is pivoted into said closed position, said first tonneau section is inhibited from longitudinal movement in at least one direction along an X-axis.

4. The tonneau cover system according to claim 1 wherein when said keeper member automatically engages said first keeper pin when said first tonneau section is pivoted into said closed position, said first tonneau section is inhibited from longitudinal movement in a fore and aft direction along an X-axis.

5. The tonneau cover system according to claim 1 wherein said keeper member comprises a keeper pin receiving slot operable to receive said first keeper pin.

6. The tonneau cover system according to claim 5 wherein said keeper pin receiving slot is shaped to be complementary to said first keeper pin such that a physical interface therebetween generally inhibits vertical movement of said first tonneau section along a Z-axis.

7. The tonneau cover system according to claim 5, further comprising:
a hinge member operably coupling said first tonneau section to said second tonneau section, said hinge member having an axis of rotation,
wherein said keeper pin receiving slot and said first keeper pin are each generally disposed at a corresponding radial distance from said axis of rotation.

8. A tonneau cover system for a cargo box of a pickup truck, said tonneau cover system comprising:
a plurality of tonneau sections each supporting a cover, said plurality of tonneau sections being positionable generally over the cargo box of the pickup truck, each of said plurality of tonneau sections being pivotally coupled to each other to permit pivotal movement of a first of said plurality of tonneau sections relative to a second of said plurality of tonneau sections between an opened position and a closed position;
a side rail member connectable to a side wall of the cargo box, said side rail member comprising a drain channel extending along at least a portion thereof, said drain channel for capturing liquid within said drain channel and a drain outlet for fluidly dispensing the captured liquid;
a keeper member downwardly extending from said first tonneau section, said keeper member being carried by said first tonneau section for pivotal movement therewith between said opened position and said closed position; and
a first keeper pin coupled with said side rail member,
wherein said keeper member automatically engages said first keeper pin when said first tonneau section is pivoted into said closed position and automatically disengages said first keeper pin when said first tonneau section is pivoted into said open position.

9. The tonneau cover system according to claim 8 wherein said drain channel of said side rail member comprises a bottom portion having a vertically-extending outboard portion and a vertically-extending inboard portion extending from said bottom portion; and
said side rail member further comprises a seal member disposed along at least a portion of said vertically-extending inboard portion of said drain channel, said seal member engageable with at least a portion of said first tonneau section.

10. The tonneau cover system according to claim 8 wherein said side rail member further comprises:
an L-shaped portion connectable to the side wall of the cargo box;
an angular member inboardly sloped from said L-shaped portion to direct moisture toward said drain channel;
wherein said drain channel comprises a bottom portion, a vertically-extending outboard portion, and a vertically-extending inboard portion together generally forming a U-shape.

11. The tonneau cover system according to claim 8 wherein said first keeper pin is coupled within said drain channel.

12. The tonneau cover system according to claim 11 wherein said drain channel of said side rail member comprises a bottom portion having a vertically-extending outboard portion and a vertically-extending inboard portion extending from said bottom portion, and
wherein said first keeper pin is coupled with said vertically-extending outboard portion and said vertically-extending inboard portion.

13. The tonneau cover system according to claim 11 wherein said first keeper pin comprises a first end and a second end, said side rail member having a trunnion channel extending at least partially within and along said drain channel, said first end of said first keeper pin being sized to be received with said trunnion channel.

* * * * *